Oct. 23, 1934.  M. KLEIN  1,978,271
GAUGE LOCKING DEVICE
Filed Dec. 10, 1928
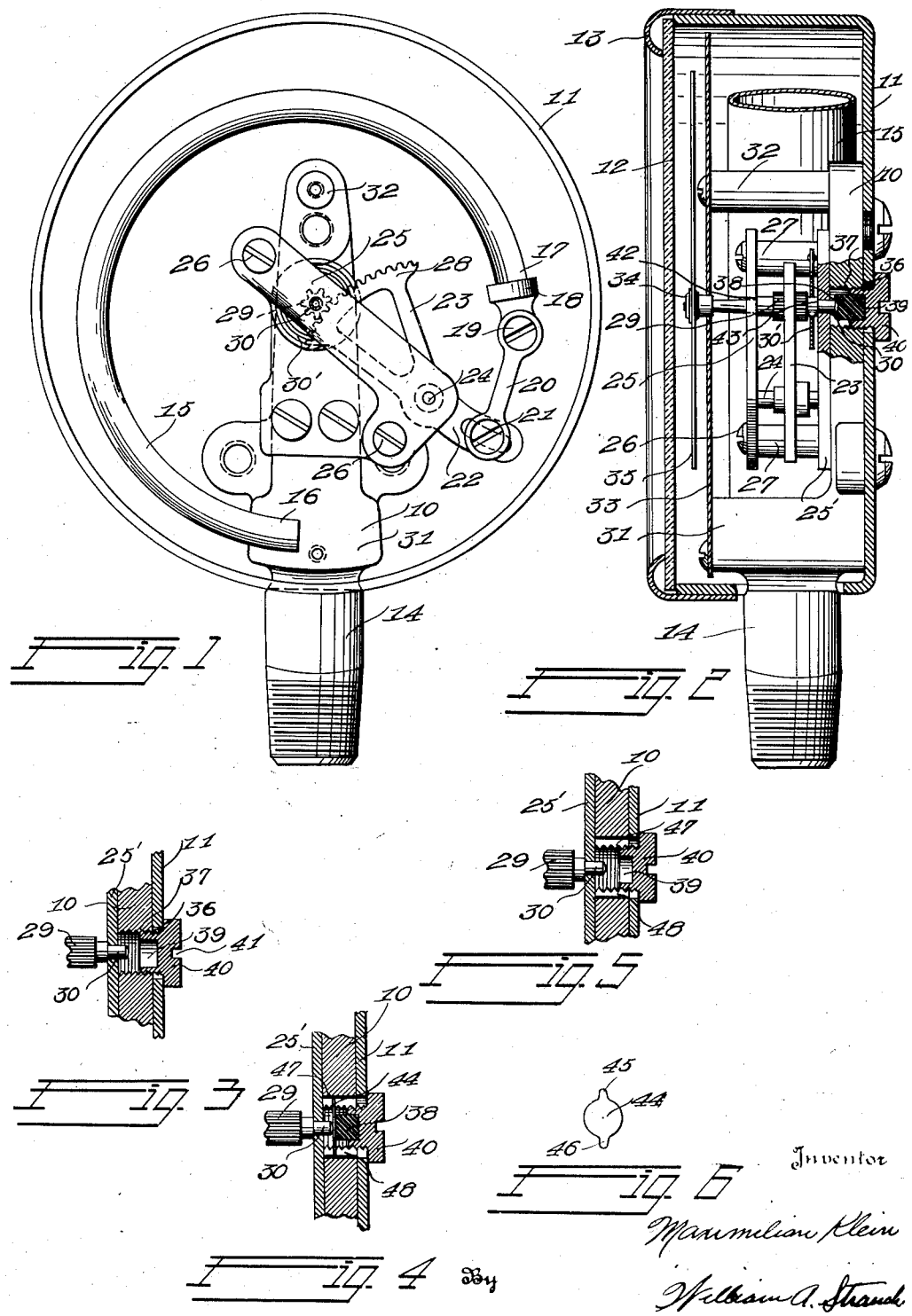

Patented Oct. 23, 1934

1,978,271

UNITED STATES PATENT OFFICE

1,978,271
GAUGE LOCKING DEVICE

Maximilian Klein, Sellersville, Pa., assignor to United States Gauge Company, New York, N. Y., a corporation of Pennsylvania Application December 10, 1928, Serial No. 325,008

9 Claims. (Cl. 116—129)

This invention relates to measuring instruments, such as pressure, gauges for example. Such instruments are generally necessarily of a relatively delicate and sensitive construction and are accordingly frequently incapable of successfully withstanding the rough usage to which they are subjected, especially during shipment thereof.

In pressure gauges utilizing a Bourdon tube, that of necessity can not be rigidly mounted in the casing, the jarring of the gauge has a tendency to cause movement of the non-rigidly mounted end of said tube, thus causing the actuation of the sector gear ordinarily connected thereto. Such actuation rotates the pinion and the indicator shaft to which it is secured against the action of the relatively delicately adjusted spring that serves to return the indicator or pointer to its zero position. The spring and parts just referred to are usually constructed for sensitive response to relatively small changes in pressure when the gauge is placed in operation, and accordingly are not adapted to withstand severe shocks without serious injury or without affecting the accuracy of the instrument, when it is placed in operation.

A primary object of this invention accordingly is to provide a measuring instrument in which means are provided for temporarily, as during shipment, firmly holding the parts of the mechanism in proper relative position so that the instrument is capable of standing relatively rough usage without damage.

A further object of the invention is to provide a measuring instrument in which a simple and inexpensive arrangement is included, to firmly hold the driven shaft of the instrument that carries the indicator when the instrument is being handled, and so designed that the instrument may readily be put in condition for use.

A further object of the invention is to provide a pressure gauge with means to firmly, but yieldingly, maintain the parts thereof in position during handling, which means is so designed as to serve its purpose without engagement with relatively delicate parts of the instrument, such as the pointers for example, that is in itself incapable of successfully withstanding substantial shocks, and of, at the same time, holding the parts, that are operatively connected to it, in position without the introduction of destructive and disturbing stresses in said parts.

Further objects of the invention will appear as a description thereof proceeds with reference to the accompanying drawing, in which:

Fig. 1 is a front elevational view of the improved measuring instrument of this application, the cover plate and dial being removed.

Fig. 2 is a vertical section of the improved instrument, the dial and cover plate being in position and showing the means for holding the indicator shaft in operative position.

Fig. 3 is a fragmentary sectional view of a portion of the instrument after the means for holding the indicator shaft in position has been removed.

Fig. 4 is a fragmentary sectional view similar to Fig. 3 by showing a modified form of mechanism for holding the indicator shaft from movement during shipment thereof.

Fig. 5 is a view similar to Fig. 4 but showing the shaft holding means removed to permit normal functioning of the apparatus.

Fig. 6 is a side view of a disk arranged to be positioned between the indicator holding means and the end of the indicator shaft.

Like reference characters indicate like parts throughout the several views.

The parts of the improved measuring instrument of this application are secured to a bracket 10 disposed within a casing 11 having a suitable removable transparent face 12 attached to the casing 11 in any suitable manner, as by a ring 13. The bracket 10 has secured to it a threaded tubular extension 14, the bore of which may be put in communication with any conduit carrying fluid under pressure.

A Bourdon tube 15 is secured rigidly at 16 to the bracket 10 with its bore in communication with the bore of the tubular extension 14. The opposite end 17 of Bourdon tube 15 may be closed by a cap 18 that is pivotally connected, as by a screw 19, to a link 20. The opposite end of link 20 is loosely secured as by a screw 21 to the slotted extension 22 of a member 23 that carries a pivot 24 that is journalled in the plates 25 and 25' that are secured, as by screws 26, and spacing sleeves 27 to the bracket 10. A portion of member 23 opposite the extension 22 is formed to provide a sector gear 28 that meshes with a pinion 29 rigidly secured on a shaft 30 journalled in the plates 25 and 25'. A spring 30' serves to return the shaft 30 and indicator hand 35 toward its zero position in well-known manner.

Suitably supported on lugs 31 and 32 of the bracket 10 is a suitably calibrated dial 33 arranged in spaced relation to the Bourdon tube 15 and the mechanism just described, and serving to cover said tube and mechanism in well-known manner. The shaft 30 has an extension 34 projecting through the dial 33, said extension having rigidly secured thereto in any suitable manner, an indicator hand 35 arranged in front of the dial 33 in position to move thereover, in accordance with the movement of the free end 17 of the Bourdon tube 15. The mechanism so far described constitutes no part of this invention and it should be understood that the invention about to be described may be applied to such an instrument as has just been described or to any other measuring instrument of equivalent construction.

Measuring instruments of the type just described are intended to respond accurately to relatively small changes in pressure, for example. Accordingly, the parts of the instrument must of necessity be of rather sensitive and delicate construction. The purpose of this invention is to provide means for maintaining the relatively delicate parts of the instrument immovably in position during the handling thereof, as during shipment thereof. It has heretofore been proposed to hold the indicator hand from movement to secure this result by means that engages the indicator hand itself. This arrangement is not entirely satisfactory because the construction of the indicator hand in itself is of relatively light construction and accordingly not well adapted to be utilized to hold the parts connected thereto in position. By this invention it is proposed to hold the parts of the instrument in proper position during handling by engaging in a yielding manner an element of the instrument between the free end of the Bourdon tube and the indicator hand. Preferably, it is proposed to firmly hold the shaft that carries both the pinion driven by the movement of the free end of the Bourdon tube and the indicator hand.

In order to secure this result the back of the casing 11 is provided with a perforation 36 and the bracket 10 is provided with a threaded bore 37 disposed opposite said perforation. Said threaded bore exposes the end of the shaft 30, which is designed so that it projects into the bore provided in said bracket. In order to yieldingly engage the end of the shaft 30 that projects into said bore a yielding block 38, preferably constructed of rubber, is disposed in a recess 39 of a threaded plug 40 provided with a screw driver slot 41 to permit it to be conveniently screwed in the threaded bore 37 in bracket 10 with the yielding block 38 in firm contact with the end of the shaft 30. In order that the pressure exerted by the block 38 and plug 40 shall not impose stresses on the mechanism of the gauge beyond its capacity to withstand the shaft 30 is preferably provided with shoulders 42 and 43 engaging respectively, the plates 25 and 25' and serving to positively hold the shaft 30 from endwise movement.

In the form of the invention shown in Figs. 4, 5 and 6, a disk 44 is disposed between the end of the shaft 30 and the resilient block 38. Said disk is provided with lateral projections 45 and 46 (Fig. 6) that enter grooves 47 and 48 provided in the bracket 10 and opening into the bore 37 in said bracket. In other respects the construction is the same as that above described referring to Figs. 1 to 3 inclusive.

In the operation of the invention, when it is desired to ship the gauge, for example, the resilient block 38 is arranged in the recess 39 of the plug 40 and said plug is threaded in the opening 37 in the bracket 10 until the resilient block 38 firmly engages the projecting end of the shaft 30. In this position said resilient block will prevent the shaft 30 from moving even if the instrument is subjected to relatively rough usage. The indicator hand, the sector gear and the free end of the Bourdon tube are, accordingly, held in definite position by a means that does not impose destructive strains upon any of the operating parts of the instrument, since the shaft 30 is capable of withstanding the endwise thrust imposed upon it without deleterious effects on the instrument as a whole. By holding the parts as just described, spring 30' is relieved of strains during handling of the instrument. When it is desired to put the instrument into use the plug 40 is unscrewed, the resilient block 38 is removed from the recess 39 therein and the plug is replaced in the bracket 10 as illustrated in Fig. 3. The instrument is then in condition to be put into use.

In the form of the invention shown in Figs. 4, 5 and 6 the disk 44 is inserted in the bore 37 in the bracket 10 with the projections 45 and 46 thereof disposed in the grooves 47 and 48 respectively. After said disk is brought in contact with the end of the shaft 30 the plug 40 carrying the resilient block 38 is threaded into the bore 37 causing said resilient block to bear firmly against the disk 44. Inasmuch as said disk is held from rotation in the manner just described, the rotation of the plug and the resilient block carried thereby cannot cause rotation of the shaft 30 no matter how firmly the block is caused to bear against the disk since the block must rotate with respect to the disk 44, disposed between it and the end of said shaft so that no tendency to turn the shaft arises. In this way the plug 40 can be screwed tightly in the recess 37 to impose a substantial yielding pressure against the end of the shaft 30 without causing movement of the shaft or the parts carried thereby from their normal position, while the plug is being screwed into its socket.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A measuring instrument comprising a casing, an indicator, a shaft to which said indicator is attached, mechanism to cause rotation of said shaft in accordance with variations in a factor to be measured, and readily removable means including a resilient block, a plug threaded in said casing to apply pressure to said block and an element non-rotatively mounted with respect to but contacting with an end of said shaft to hold said shaft from movement during handling of the instrument.

2. A pressure gauge, comprising a casing, actuating means disposed in said casing, an indicator, mechanism operatively connecting said actuating means to said indicator, and readily removable means including a yielding block, a plug threaded in said casing to apply pressure to said block and a non-rotatively mounted element disposed between said block and a portion of said mechanism to hold said mechanism and indicator immovably in position during handling of said gauge.

3. A measuring instrument comprising a casing, an indicator, a shaft to which said indicator is secured, elements secured to said casing to support said shaft, and means including a plug threaded in one of said elements and a resilient block between said shaft and said plug arranged to selectively apply a yielding pressure to said shaft to hold it and said indicator immovably in position.

4. A measuring instrument comprising a casing, an indicator, a shaft to which said indicator is secured, elements secured to said casing to support said shaft, and means including a recessed plug threaded in one of said elements and a removable resilient block seated in said recessed plug and adapted to apply a yielding pressure to said shaft to hold it and said indicator immovably in position.

5. A measuring instrument comprising a casing, an indicator, a shaft to which said indicator is secured, elements secured to said casing to support said shaft, and means including a recessed plug threaded in one of said elements, a removable resilient block seated in said recessed plug and a non-rotatively mounted element between said block and an end of said shaft to apply a yielding pressure to said shaft without causing its rotation whereby said shaft and indicator are held immovably in said casing.

6. A measuring instrument comprising a casing, a shaft rotatively mounted in said casing, an indicator movable with said shaft, and a plug threaded in said casing and carrying a removable resilient block arranged to apply a holding pressure to said shaft to prevent rotation of said shaft and indicator during handling of said instrument.

7. A measuring instrument comprising a casing, a shaft rotatively mounted in said casing, an indicator movable with said shaft, and a threaded plug carrying a removable resilient block arranged to apply a holding pressure to said shaft to prevent rotation of said shaft, and an element non-rotatively mounted in said casing and disposed between said block and said shaft whereby a holding pressure may be applied to said shaft by manipulation of said plug without thereby causing movement of said shaft.

8. A measuring instrument comprising a casing, an indicator, a shaft to which said indicator is attached, mechanism to cause rotation of said shaft in accordance with variations in a factor to be measured, there being an opening through said casing exposing a portion of said shaft, and readily removable means extending into and closing said opening, said means being adapted to receive a resilient block for exerting a yielding pressure against the exposed portion of said shaft.

9. A measuring instrument comprising a casing, an indicator, a shaft to which said indicator is attached, mechanism to cause rotation of said shaft in accordance with variations in a factor to be measured, there being an opening through said casing in line with said shaft, an element in said opening restrained from side motion but contacting a portion of said shaft and readily removable means extending into said opening, said means being adapted to receive a resilient block for exerting a yielding pressure against said element which in turn presses against said shaft.

MAXIMILIAN KLEIN.